United States Patent [19]

Kidd

[11] Patent Number: 5,147,430
[45] Date of Patent: Sep. 15, 1992

[54] AIR SCOOP SCREEN

[76] Inventor: Steven A. Kidd, 8403 Alameda Ct., Alexandria, Va. 22309

[21] Appl. No.: 665,486

[22] Filed: Mar. 6, 1991

Related U.S. Application Data

[62] Division of Ser. No. 103,216, Oct. 1, 1987, abandoned.

[51] Int. Cl.$^5$ ............................................. B01D 39/08
[52] U.S. Cl. .................................... 55/385.3; 55/505; 55/507; 55/509; 55/511; 55/DIG. 5
[58] Field of Search ............. 55/385.3, 491, 497, 55/505, 507, 509, 511

[56] References Cited

U.S. PATENT DOCUMENTS

| | | | |
|---|---|---|---|
| 2,551,923 | 5/1951 | Berge | 55/505 X |
| 2,875,840 | 3/1959 | Klemm | 180/54 |
| 2,988,169 | 6/1961 | Klein | 55/509 X |
| 3,127,259 | 3/1964 | Boylan | 55/511 |
| 3,203,158 | 8/1965 | Zadra | 55/505 |
| 3,249,172 | 5/1967 | De Lorean | 180/68.3 |
| 3,458,130 | 7/1969 | Juhlin | 55/511 X |
| 3,481,117 | 12/1969 | McKinlay | 55/385.3 |
| 3,481,119 | 12/1969 | McKinley | 55/419 |
| 3,552,103 | 1/1971 | Smith | 55/486 |
| 3,641,746 | 2/1972 | Smith et al. | 55/385.3 |
| 3,941,034 | 3/1976 | Helwig et al. | 55/385.3 |
| 3,971,877 | 7/1976 | Lee | 55/509 X |
| 3,987,862 | 10/1976 | Lidstone | 55/385.3 X |
| 4,013,137 | 3/1977 | Petersen | 55/342 X |
| 4,039,308 | 8/1977 | Schiff | 55/505 |
| 4,080,184 | 3/1978 | Petersen | 55/315 |
| 4,159,899 | 7/1979 | Deschenes | 55/454 |
| 4,198,217 | 4/1980 | Erdmannsdorfer | 55/457 X |
| 4,420,057 | 12/1983 | Omote | 180/54 A |
| 4,454,926 | 6/1984 | Akins | 180/68.1 |

FOREIGN PATENT DOCUMENTS 0569458  5/1945  United Kingdom ................. 55/491

Primary Examiner—Robert Spitzer
Attorney, Agent, or Firm—James Creighton Wray

[57] ABSTRACT

An air scoop screen is used in the incoming end of an automotive air intake to prevent the ingestion of rocks or debris thrown up by preceding vehicles. A rectangular fiberglass screen is folded outward along its edges to form a rectangular screen with rectangular edges about 90 degrees to the screen body. Rigid reinforcements may be placed inside the edges and secured to a Velcro fastener and to the screen edges to assist in maintaining the rectangular shape. A hook-type Velcro fastener is bonded to the inside of the intake scoop near its front end. The screen is inserted in the air scoop and, with the fingers on the inside of the edges, the Velcro fastener attached to the screen is pressed into the Velcro fastener bonded on the inside of the air scoop.

4 Claims, 1 Drawing Sheet

AIR SCOOP SCREEN

This application is a division of application Ser. No. 103,216, filed Oct. 1, 1987, now abandoned.

BACKGROUND OF THE INVENTION

The invention relates to screens employed with automotive air intakes.

Internal combustion engines rely upon relatively large quantities of air in the combustion of relatively small quantities of fuel. It is desirable that air be taken from a relatively cool area so that density of the air is not reduced by preheating. It is also desirable to admit air into a frontal portion of a moving vehicle so that the relative velocity of the vehicle and air may result in an increase in density of the incoming air at ambient temperature to achieve these desired results. Some high performance vehicles are equipped with air scoops having forward openings which receive air or ram air to ensure a continued supply of air to a carburetor. Often, filtering of the air is minimized or eliminated to prevent reduction in critical air flow to a high performance engine.

A problem exists in that large particles such as rocks and pebbles may be ingested into a forward opening air scoop and may pass through the carburetor and into an engine where the particles may destroy functions of the engine or render it completely inoperative or unusable.

The problem is particularly acute in automotive competitions which require high acceleration rates. One particular example is in drag racing.

In early heats, cars line up and, as the cars reach the front of the line, they move forward to an area in which brakes are applied to the non-traction wheels and the driving wheels are rotated to effect a burning-in or a heating and softening of the outer surfaces of the drive wheels to render them gummy or suitable for maximum adherence during the acceleration test or competition.

During that period, the softened outer surfaces of the tires are likely to pick up any particulate material and fling the material rearward, such as directly towards the next car in line, which is waiting its turn. When the rocks or pebbles or otherwise rearward flung particulate materials are thrown into the air intakes of the next cars, disastrous results may occur. An engine may be destroyed even though a person may immediately shut it down upon hearing an ingested particle impinging on the air scoop.

Some persons have approached the problem of protection of such scoops by placing a stretched cover over the intake and leaving the cover in place until the competition vehicle in front of them has completed its tire preparation and has moved into position for start. Usually that requires an assistant who may then reach over the hood of a car and remove the cover. If the cover is removed too soon, its value in stopping particles is destroyed. Often, there is not enough time for the driver of an automobile to step from the automobile, remove the cover, return to the automobile and move into position.

The present invention provides a solution to the long-standing problem.

SUMMARY OF THE INVENTION

An air scoop screen is used in the incoming end of an automotive air intake to prevent the ingestion of rocks or debris thrown up by preceding vehicles. A rectangular fiberglass screen is folded outward along its edges to form a rectangular screen with rectangular edges about 90 degrees to the screen. Rigid reinforcements may be placed inside corners of the edges and may be secured to a surrounding Velcro fastener and to the screen to assist in maintaining the rectangular shape. A hook-type Velcro fastener is bonded to the inside of the intake scoop near its front end. The screen is inserted in the air scoop and, with the fingers on the inside of the edges, the Velcro fastener attached to the screen is pressed into the Velcro fastener bonded on the inside of the air scoop.

One preferred automotive air scoop screen comprises a rectangular fiberglass screen folded outward along its periphery to form upper and lower and first and second opposite side flange-like edge portions. The flange-like edge portions form rectangular intersections between the upper flange-like edge portion and the two side edge portions and between the lower flange-like edge portion and the two side flange-like edge portions. Rectangular reinforcements connected to the intersections maintain the intersections in generally rectangular configuration. Microloop-type fastener strips are fixed on outward facing surfaces of the flange-like edge portions. A complementary microhook-type fastener strip has microhook-type fastener elements on one surface thereof. In one embodiment bonding means on the other surface of the microhook-type fastener strip secures it on inside upper, lower and opposite side portions of an automotive air intake.

Preferably, the first fastener strip extends entirely around the flange-like edge portions of the screen.

In one embodiment of air scoop screen, the first strip has an inside surface which is adhesively bonded to an outside surface of the flange-like edge portions.

In one embodiment the microhook-type fastener is bonded to an inside of the air scoop using a heat stable industrial glue such as supplied by 3M Corporation. The microloop-type strip is sewn to the outside of the flange-like portions of the screen with stitches which extend through the microloop backing strip, through the screen flanges and through an internal backing strip, for example of ⅝ inch wide polyester grossgrain ribbon. Corner supports are bent plastic strips such as collar stays. If the corner reinforcement is accidentally drawn into the engine, no damage occurs.

The air scoop screen may be positioned on the outside of an air scoop. In that case the microhook strip is bonded to an outer peripheral area around the scoop opening. The loop-type fastener strip is sewn inside the screen flange with stitches through the strip, the flange and a crossgrain reinforcement inside the screen. The corners of the screen between the centr area and the flanges bear against the edges of the air scoop opening and help to hold the screen in place.

These and further and other objects and features of the invention are apparent in the disclosure which includes the above and ongoing written specification with the claims and the drawings.

DETAILED DESCRIPTION OF THE DRAWINGS

Figure 1:
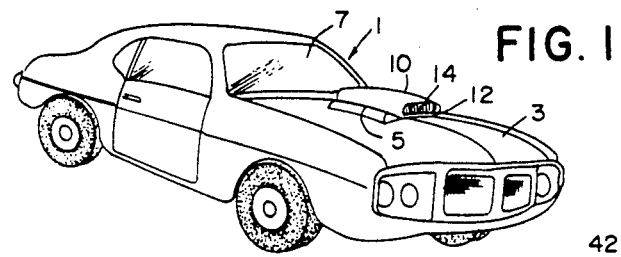
FIG. 1 is a perspective view of a competition automobile with an air scoop.

Referring to the drawings, an automobile is generally indicated by the numeral 1 in FIG. 1. The automobile has a hood 3 on which is mounted an upward opening standard 5, which also may be an upward extension of the hood. On top of the standard or pedestal 5, an air scoop 10 is mounted. The conventional air scoop 10 has a low profile rectangular shape so as not to obscure vision through the windshield 7 of automobile 1.

Other shapes of scoops are known such as scoops having rectangular or square cross-sections or round cross-sections. Usually, the opening in the scoop is similar in shape to the general cross-section of the scoop. As shown in FIG. 1, air scoop 10 has an opening 12 at its front edge 14. A microhook-type fastener strip 20 is fixed to the inside walls 16 of air scoop 10 along forward edge portions thereof.

The fastener strip 20 may be replaced by any type of conventional fasteners, such as for example a selective bonding material which would bond only to a complementary strip of bonding material.

Figure 3:
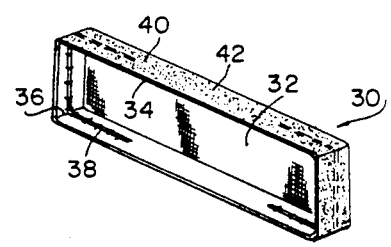
FIG. 3 is a perspective view of an air scoop screen showing a fiberglass screen, flange-like edge portions of the screen, corner reinforcements, and a microloop-type fastener strip bonded to the outside of the flange-like edge portions.

As shown in FIG. 3, an air scoop screen 30 is made out of a rectangular sheet of fiberglass screen 32 having forward turned edges 34 which form upper and lower and opposite side flange-like edge portions. Intersections 36 of the edge portions may be provided with rectangular reinforcements 38 such as wires bent at right angles and stitched or otherwise secured to the screen or thin plates bent at right angles and bonded or stitched or otherwise fastened to the screen material.

Figure 2:
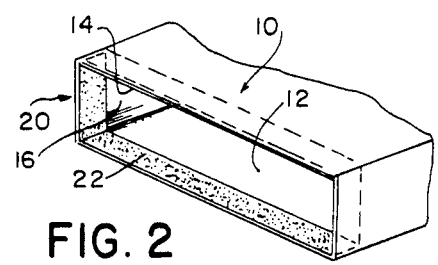
FIG. 2 is a partial perspective view of the leading portion of an air scoop, showing the opening with a strip of microhook-type fasteners bonded to the inside near the leading edge.

As shown in FIG. 3, a strip 40 of material has outward extending microloops 42 or a felt surface which cooperates with inward extending microhooks 22 as shown in FIG. 2. Strip 40 has an inner adhesive surface which tightly adheres to the outer surfaces of flange-like edge portions 34. Preferably, the strip 40 extends completely around the edge portions.

Strips 40 and 20 may be replaced by any suitable strips of complementary fasteners such as, for example, snap fasteners or interfitting groove fasteners. Microhook and loop complementary fastener strips are useful because they are readily available in adhesive-backed material and may be readily assembled to the screen and to the air scoop.

Figure 4:
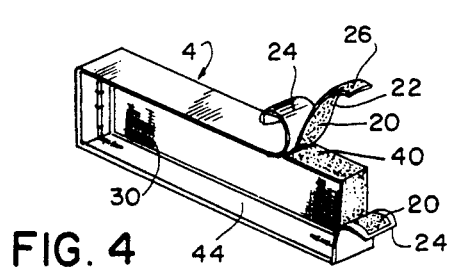
FIG. 4 is a detail of a kit in which a microloop-type strip has been bonded to an outside of flange-like edge portions of the air scoop screen and in which a hook strip is fastened to the loop strip, the hook strip having adhesive bonding on its outermost surface and having a release layer covering the adhesive bonding on the hook strip. In the first step, as shown in FIG. 4, the hook strip is removed from the loop strip.

FIG. 4 shows a view of a kit in which the air scoop screen 30 has a fastener strip 40 permanently attached thereto such as by sewing strip 40 to edge portions 34 and an opposite reinforcement. A complementary microstrip 20 may be temporarily attached by the fastener action between strips 20 and 40.

Figure 5:
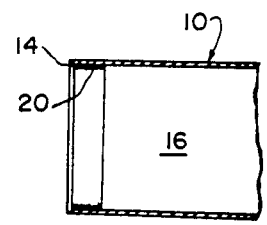
FIG. 5 shows the hook strip bonded in place in the inside of the air scoop, after the release layer has been removed from the hook strip.

Strip 20 has an outer release layer 24 covering its outer adhesive surface 26. To use the kit 4, the strip 20 with its outer release layer 24 is pulled from the microloops on strip 40 which is permanently attached to the screen. The release layer 24 is then pulled from the outside of the hook strip 20 and the hook strip 20 is placed in position in the inside surfaces 16 of the air scoop 10 directly adjacent the front edge 14. Strip 20 is pressed outward to firmly bind the strip to the inner surface of the air scoop as shown in FIG. 5. Alternatively, after the inside peripheral areas of the scoop are cleaned, an industrial adhesive is spread on an outer surface of the second fastener strip, and the freshly coated surface is pressed against the cleaned peripheral areas of the scoop. Alternatively, both may be precoated with adhesive which is allowed to partially dry to a tacky condition before pressing the two surfaces together.

Figure 6:
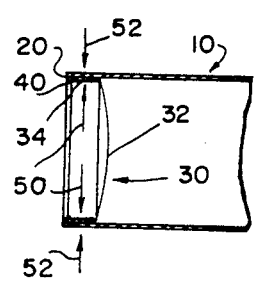
FIG. 6 shows the exertion of pressure, usually between fingers and thumbs, to ensure the engagement of the loops on the loop strip with hooks on the hook strip which is bonded to the inside of the air scoop.

As shown in FIG. 6, after the strip 20 is mounted in the air scoop, the air scoop screen 30 is inserted by aligning the corners and then pressing the fastener strip 40 into engagement with the complementary fastener strip 20 by exerting finger and thumb pressure on the inside of the flange-like edge portions 44 and the outside of the air scoop 10 as shown by arrows 50 and 52.

Figure 7:
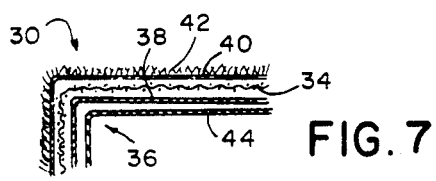
FIG. 7 shows a cross-sectional view of a corner of the air scoop screen shown in FIGS. 1–6.

FIG. 7 shows a cross-sectional view of a corner of the air scoop screen shown in FIGS. 1–6.

Figure 8:
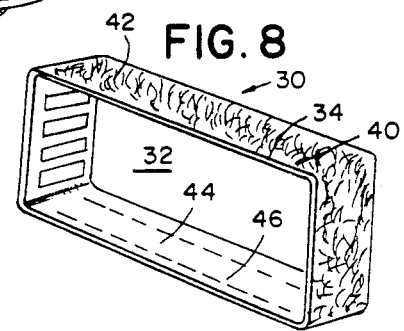
FIG. 8 is a perspective view showing the screen, grosgrain ribbon, stitches and fastener tape.

FIG. 8 is a perspective view showing the screen, grosgrain ribbon, stitches 46 and fastener tape.

The invention is intended to keep rocks and pebbles and other particulate material out of air scoops of high performance engines. While the invention has been described with the use of a fiberglass screen, any suitable screen material may be employed. While self-adhesive microloop and fastener complementary strips have been described, any suitable complementary fastening systems may be employed. The strips have been described as being adhered by sewing or bonding or both to the flange-like edge portions of the screen, but any suitable attachment may be employed, for example, physically connecting the strips and screen, such as by weaving or felting or by attaching the fasteners through the screen. The screen may be marketed in kits preformed to conventional sizes of air scoops. For example, one widely used air scoop has an opening 13½ inches long by 2½ inches high. Adhesive backed complementary fastener strips are approximately ⅜ inch wide. Rocks or other particulate materials flung into the intake are caught by the flexible screen and held therein until they are later removed, either by lifting them from the screen or removing the screen by first pulling apart the fasteners.

While the invention has been described with reference to specific embodiments, modifications and variations of the invention may be made without departing from the scope of the invention. The scope of the invention is defined in the following claims.

I claim:

1. An automotive air scoop screen for a high performance racing automobile comprising a soft, flexible rectangular fiberglass fabric screen folded outward along its periphery to form soft upper and lower and first and second opposite side soft, flexible flange-like fabric screen edge portions, the flange-like edge portions forming rectangular intersections between the upper flange-like edge portion and the two side edge portions, and between the lower flange-like edge portion and the two side flange-like edge portions, and a first soft, flexible microloop-type fastener strip fixed on outward-facing surfaces of the flange-like edge portions and a complementary soft microhook-type fastener strip with first and second surfaces and with microhook-type fastener elements on the first surface thereof, and securing means on the second surface for joining the second surface of the microhook-type fastener strip with peripheral upper, lower and opposite side portions surrounding an intake opening of an automotive air intake on a high speed racing automobile, wherein the first fastener strip extends entirely around the flange-like edge portions of the screen, and wherein the first strip has an inside surface which lies against an outside surface of the flange-like edge portions and is joined thereto by textile fabric stitches extending through the first strip, the flange-like edge portions and a soft, flexible grosgrain ribbon reinforcement tape positioned around and against an inside surface of the flange-like edge portions.

2. An air scoop screen kit apparatus for an air scoop of a high performance automobile comprising a soft, flexible screen material having a central portion and a peripheral portion bent rectangularly to the central portion and formed as a flange-like edge portion surrounding the central portion of the screen, a first fastener strip attached to the flange-like edge portion of the screen, the first fastener strip having first fastener means extending therefrom, a second fastener strip having a first surface and bonding means for bonding the first surface and for thereby attaching the second strip to an inside surface of a performance automobile air scoop, the second strip having second fastener means extending therefrom for complementary engagement with the first fastener means on the first fastener strip for holding the first fastener strip in fixed engagement with the second fastener strip and thereby holding the flange-like edge portion of the screen and the screen in fixed engagement with the first fastener strip, with the second fastener strip and with the air scoop, wherein the second fastener means is on an inside of the second fastener strip, wherein when the second fastener strip is adhered to an inside surface of an air scoop the second fastener means extends inwardly within the air scoop near an air scoop opening, wherein the first fastener strip has the first fastener means on an outer surface thereof for attaching to the inward-extending second fastener means on the second fastener strip, wherein the first fastener strip has adhesive means on an inner surface thereof which adhesive is adhered to an outer surface of the flange-like edge portion of the screen, further comprising reinforcing a soft, flexible, polyester grosgrain strip connected to the flange-like edge portion of the screen along an inner surface thereof, wherein the reinforcing strip is physically connected with fabric stitches of nylon thread and cemented to and through the screen to the first fastener strip, and wherein a body portion of the screen is curved rearward.

3. A method of making an automotive air scoop screen comprising forming a soft, flexible rectangular fiberglass screen folding the screen outward along its periphery and forming upper and lower and first and second opposite side soft, flexible flange-like edge portions, forming rectangular intersections between the upper flange-like edge portion and the two side edge portions, and between the lower flange-like edge portion and the two side flange-like edge portions, and wrapping a first soft, flexible microloop-type fastener strip fixed around outward-facing surfaces of the flange-like edge portions and joining a complementary microhook-type fastener strip with first and second surfaces and with microhook-type fastener elements on the first surface thereof, and applying bonding securing means on the second surface and joining the second surface of the microhook-type fastener strip with peripheral upper, lower and opposite side portions surrounding an intake opening of an automotive air intake, extending the first fastener strip entirely around the flange-like edge portions of the screen, and laying an inside surface of the first strip against an outside surface of the flange-like edge portions and joining by stitching textile fabric stitches through the first strip, the flange-like edge portions and through a soft, flexible grosgrain ribbon reinforcement tape positioned around and against an inside surface of the flange-like edge portions.

4. A method of making an air scoop screen kit apparatus for an air scoop of a high performance automobile comprising forming a soft, flexible screen material having a central portion and bending a peripheral portion rectangularly to the central portion and forming the peripheral portion as a flange-like edge portion surrounding the central portion of the screen, attaching a first fastener strip to the flange-like edge portion of the screen, extending first fastener means from the first fastener strip, positioning a second fastener strip having a first surface and bonding the first surface and thereby attaching the second strip to an inside surface of a performance automobile air scoop, extending second fastener means extending from the second strip for complementarily engaging the first and second fastener means on the first and second fastener strips and holding the first fastener strip in fixed engagement with the second fastener strip and thereby holding the flange-like edge portion of the screen and the screen in fixed engagement with the first fastener strip, with the second fastener strip and with the air scoop, wherein the second fastener means is mounted on an inside of the second fastener strip, wherein when the second fastener strip is adhered to an inside surface of an air scoop the second fastener means extending inwardly within the air scoop near an air scoop opening, wherein the first fastener strip has the first fastener means on an outer surface thereof for attaching to the inward-extending second fastener means on the second fastener strip, adhering adhesive on the first fastener strip on an inner surface thereof to an outer surface of the flange-like edge portion of the screen, further reinforcing the screen with a soft, flexible, polyester grosgrain strip connected to the flange-like edge portion of the screen along an inner surface thereof, and physically connecting the reinforcing strip with fabric stitches of nylon thread and cement through the screen to the first fastener strip, and curving a body portion of the screen rearward.

* * * * *